US012614950B2

(12) United States Patent
Singh et al.

(10) Patent No.: US 12,614,950 B2
(45) Date of Patent: Apr. 28, 2026

(54) ELECTRICAL DRIVE MODULE HAVING MECHANICALLY COUPLED RING GEAR AND CLUTCH BASKET

(71) Applicant: FCA US LLC, Auburn Hills, MI (US)

(72) Inventors: Tejinder Singh, West Bloomfield, MI (US); Xie Xie, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 230 days.

(21) Appl. No.: 18/493,891

(22) Filed: Oct. 25, 2023

(65) Prior Publication Data

US 2025/0141303 A1 May 1, 2025

(51) Int. Cl.
| | |
|---|---|
| *H02K 7/116* | (2006.01) |
| *H02K 7/00* | (2006.01) |
| *H02K 7/108* | (2006.01) |

(52) U.S. Cl.
CPC ............. *H02K 7/116* (2013.01); *H02K 7/006* (2013.01); *H02K 7/108* (2013.01)

(58) Field of Classification Search
CPC ........... H02K 7/116; H02K 7/006; H02K 1/08
USPC ............................... 310/75 R, 78, 83, 98, 99
See application file for complete search history.

(56) References Cited

U.S. PATENT DOCUMENTS

2018/0216672 A1* 8/2018 Putzer ..................... F16D 28/00

FOREIGN PATENT DOCUMENTS

| | | | | |
|---|---|---|---|---|
| DE | 102017129261 A1 | * | 9/2018 | ........... F16D 13/585 |
| DE | 102019129653 A1 | | 5/2021 | |
| JP | 2016191457 A | * | 11/2016 | |
| KR | 20190099257 A | | 8/2019 | |

OTHER PUBLICATIONS

International Search Report and Written Opinion dated Jan. 30, 2025 for International Application No. PCT/US2024/052774, International Filing Date Oct. 24, 2024.

* cited by examiner

*Primary Examiner* — Jose A Gonzalez Quinones
(74) *Attorney, Agent, or Firm* — Jeremy J. Klobucar

(57) ABSTRACT

An electric drive module that generates and transfers drive torque to a driveline of an electrified vehicle is provided. The electric drive module includes an electric drive gearbox assembly having a ring gear, a clutch assembly and a plurality of mechanical joining members. The ring gear receives a rotational input from an electric motor of the electric drive module and defines a first plurality of passages therein. The clutch assembly includes a clutch basket that receives a plurality of clutch plates therein, the clutch basket having a second plurality of passages therein. The plurality of mechanical joining members extend through the first plurality of passages of the ring gear and the second plurality of passages in the clutch basket, the plurality of mechanical joining members mitigating loads experienced between the ring gear and the clutch basket.

15 Claims, 4 Drawing Sheets

ELECTRICAL DRIVE MODULE HAVING MECHANICALLY COUPLED RING GEAR AND CLUTCH BASKET

FIELD

The present application generally to electrified vehicles and, more particularly, to an electrical drive module having a mechanically coupled ring gear and clutch basket.

BACKGROUND

An electrified vehicle (hybrid electric, plug-in hybrid electric, range-extended electric, battery electric, etc.) includes at least one battery system and at least one electronic drive module having an electric motor and associated transmission or electric drive gearbox assembly. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. The electric drive module typically includes an input gear such as a ring gear that drives the electric drive gearbox assembly. In prior art configurations, the ring gear is generally welded to a clutch basket of the electric drive gearbox assembly. However, it is typically difficult to achieve a robust weld design that can take tangential, radial and axial gear mesh loads. Accordingly, while such electronic drive modules do work well for their intended purpose, there is a desire for improvement in the relevant art.

SUMMARY

According to one example aspect of the invention, an electric drive module that generates and transfers drive torque to a driveline of an electrified vehicle is provided. The electric drive module includes an electric drive gearbox assembly having a ring gear, a clutch assembly and a plurality of mechanical joining members. The ring gear receives a rotational input from an electric motor of the electric drive module and defines a first plurality of passages therein. The clutch assembly includes a clutch basket that receives a plurality of clutch plates therein, the clutch basket having a second plurality of passages therein. The plurality of mechanical joining members extend through the first plurality of passages of the ring gear and the second plurality of passages in the clutch basket, the plurality of mechanical joining members mitigating loads experienced between the ring gear and the clutch basket.

In some implementations, the clutch basket defines a series of tabs extending around a circumference thereof. The second plurality of passages are respectively formed in the series of tabs.

In some implementations, the series of tabs are equally spaced around the circumference of the clutch basket.

In some implementations, the ring gear defines a series of insets formed therearound. The series of insets cooperate to receive the respective series of tabs of the clutch basket.

In some implementations, the series of insets each include opposing inset sidewalls. The series of tabs of the clutch basket nest within the respective series of insets of the ring gear.

In additional aspects, the opposing inset sidewalls oppose and inhibit rotation of the respective tabs of the clutch basket.

In additional features, the mechanical joining members comprise rivets. In other examples, the mechanical joining members comprise bolts. In additional features, a weld is provided between the ring gear and the clutch basket.

According to another example aspect of the invention, an electric drive module that generates and transfers drive torque to a driveline of an electrified vehicle is provided. The electric drive module includes an electric drive gearbox assembly having a ring gear, a clutch assembly and a plurality of mechanical joining members. The ring gear receives a rotational input from an electric motor of the electric drive module. The ring gear defines a series of insets thereon that define a first plurality of passages therein. The clutch assembly includes a clutch basket that receives a plurality of clutch plates therein, the clutch basket includes a series of tabs extending around a circumference thereof. A second plurality of passages are respectively formed in the series of tabs. The plurality of mechanical joining members extend through the first plurality of passages of the ring gear and the second plurality of passages in the clutch basket. The series of tabs nest within the respective series of insets thereby mitigating loads experienced between the ring gear and the clutch basket.

In some implementations, the series of insets each include opposing inset sidewalls that inhibit rotation of the respective tabs of the clutch basket.

In additional features, the mechanical joining members comprise rivets. In other examples, the mechanical joining members comprise bolts. In additional features, a weld is provided between the ring gear and the clutch basket.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, an electric drive module for an electrified vehicle typically includes an input gear such as a ring gear that drives an electric drive gearbox assembly. In prior art configurations, the ring gear is generally welded to a clutch basket of the electric drive gearbox assembly. However, it is typically difficult to achieve a robust weld design that can take tangential, radial and axial gear mesh loads experienced between the ring gear and clutch basket which can lead to premature damage or failure of the electric drive gearbox assembly.

The instant disclosure provides a mechanical coupling between the ring gear and clutch basket. The mechanical coupling comprises a series of bolts or rivets arranged circumferentially around the ring gear and clutch basket that mechanically couple the ring gear and the clutch basket. In addition, the clutch basket is provided with a series of outwardly extending tabs extending therearound that locate into respective complementary insets defined around the ring gear. The tabs therefore nest within the insets providing supplemental mechanical fixing that inhibit relative rotation of the ring gear and clutch basket. The mechanical coupling absorbs the tangential and partially radial gear mesh loads associated with the ring gear improving robustness and durability.

Figure 1:
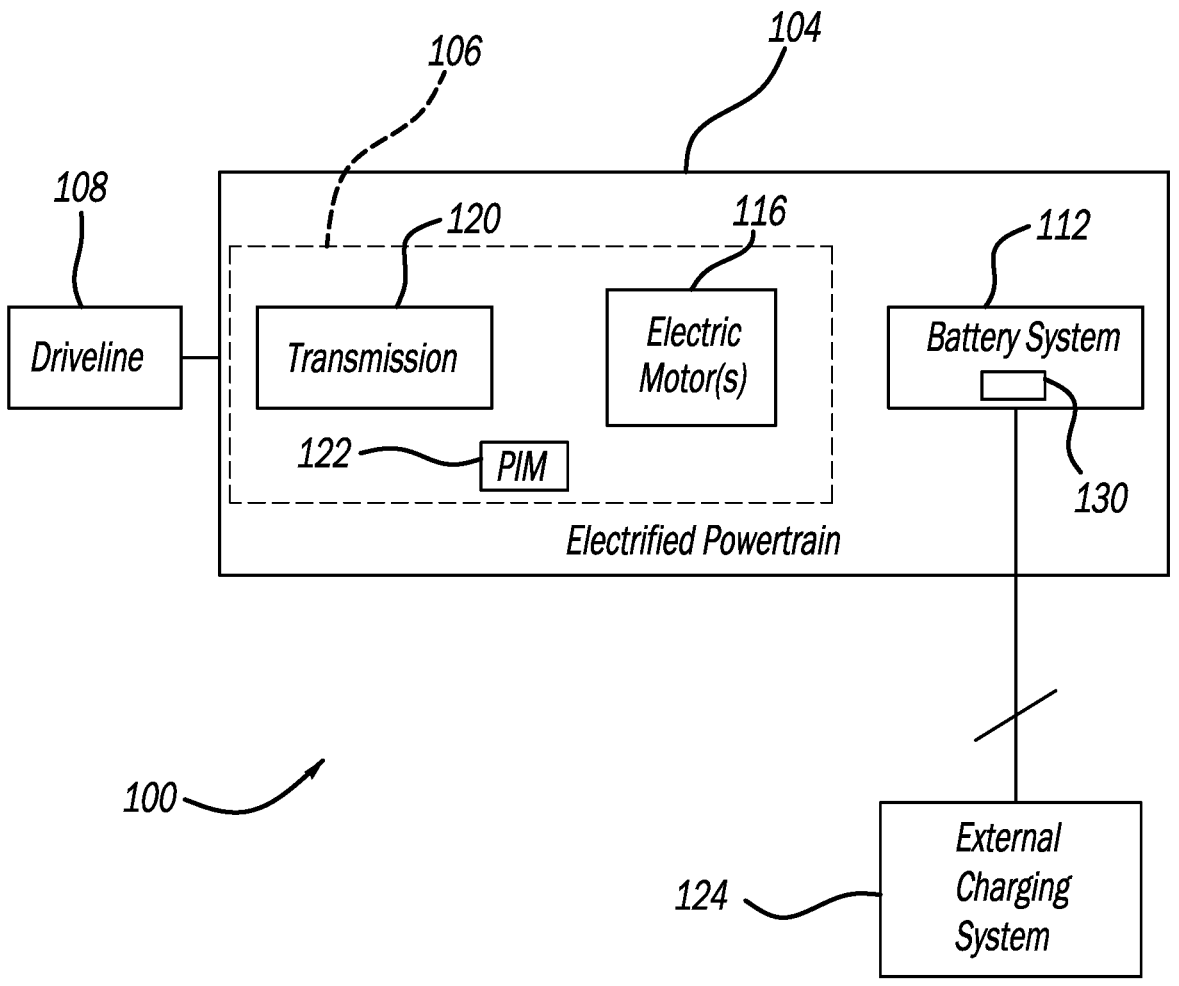
FIG. 1 is a functional block diagram of an electrified vehicle having an electronic drive module including an electric drive gearbox that incorporates a mechanically coupled ring gear and clutch basket according to the principles of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 having an electric drive module (EDM) 106 configured to generate and transfer drive torque to a driveline 108 for vehicle propulsion. The EDM 106 generally includes one or more electric drive units or motors 116 (e.g., electric traction motors), an electric drive gearbox assembly or transmission 120, and power electronics including a power inverter module (PIM) 122.

The electric motor 114 is selectively connectable via the PIM 124 to a high voltage battery system 112 for powering the electric motor 116. The battery system 112 is selectively connectable (e.g., by the driver) to an external charging system 124 (also referred to herein as "charger 124") for charging of the battery system 112. The battery system 112 includes at least one battery pack assembly 130.

Figure 2:
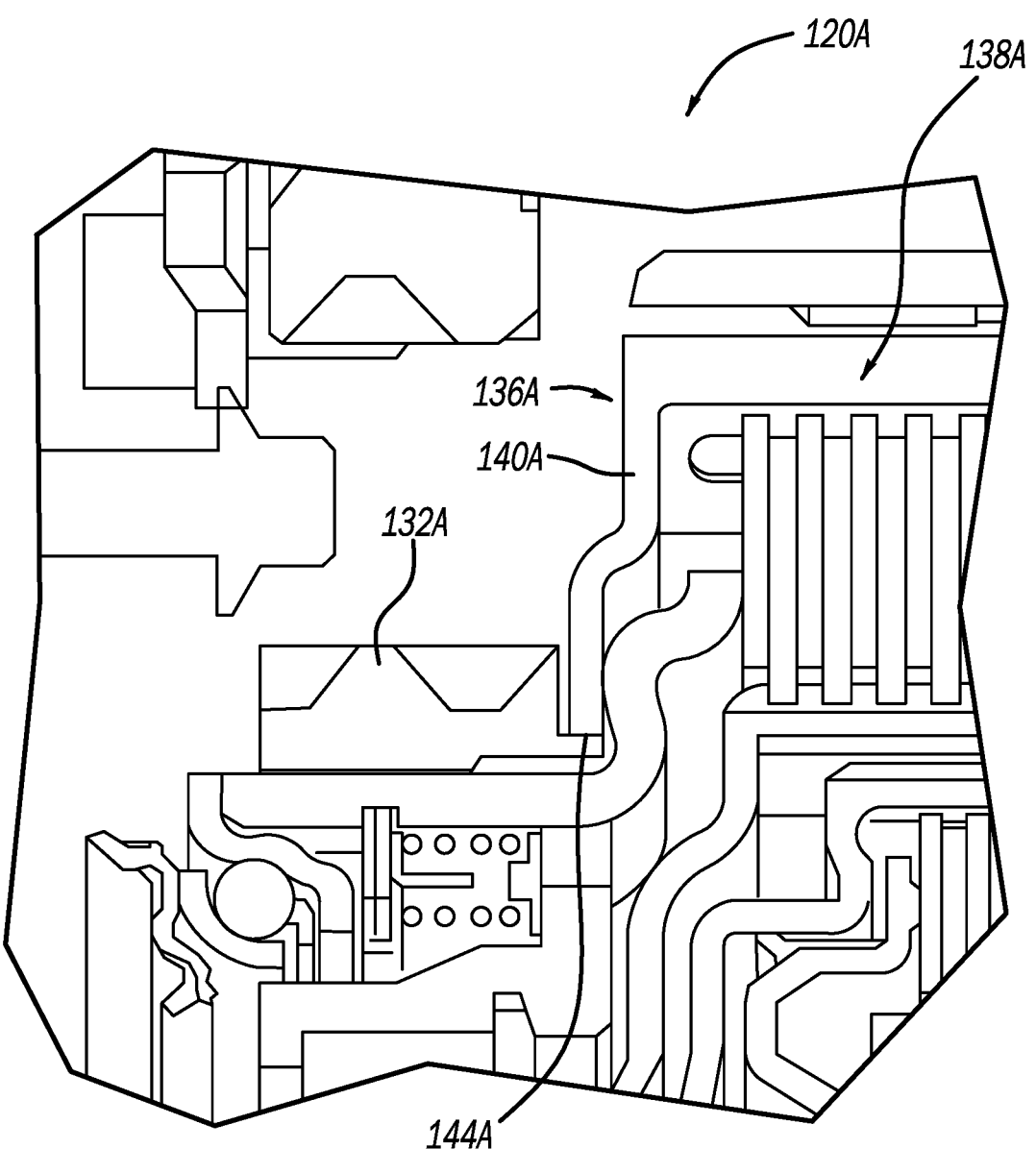
FIG. 2 is a cross-sectional view of a portion of an electric drive gearbox that includes a welded ring gear and clutch basket according to one Prior Art configuration.

With additional reference now to FIG. 2, an electric drive gearbox assembly 120A constructed according to one Prior Art example is shown. The electric drive gearbox assembly 120A includes an input or ring gear 132A that rotatably drives a clutch assembly 136A comprising a plurality of clutch plates 138A disposed within a clutch basket 140A. A weld joint 144A is provided between the ring gear 132A and the clutch basket 140A. In examples, the weld joint 144A is provided around (360 degrees) the ring gear 132A and the clutch basket 140A. As discussed above, it is typically difficult to achieve a robust weld design that can take tangential, radial and axial gear mesh loads experienced between the ring gear 132A and the clutch basket 140A.

Figure 3:
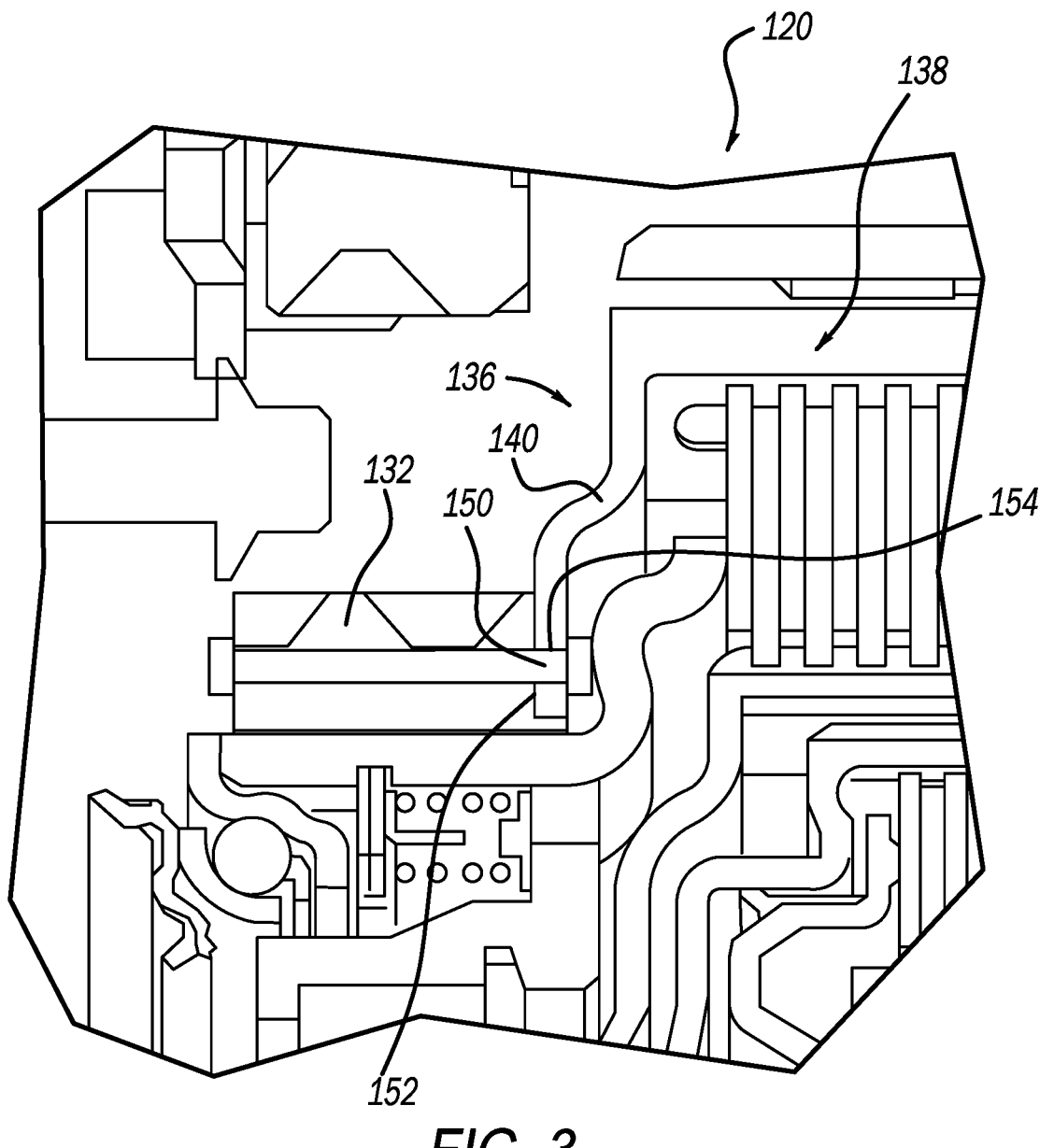
FIG. 3 is a cross-sectional view of a portion of an electric drive gearbox illustrating a mechanically coupled ring gear and clutch basket according to examples of the present application.

Turning now to FIG. 3, an electric drive gearbox assembly 120 constructed in accordance to the present disclosure is shown. The electric drive gearbox assembly 120 includes an input or ring gear 132 that rotatably drives a clutch assembly 136 comprising a plurality of clutch plates 138 disposed within a clutch basket 140. As illustrated in FIG. 3, a mechanical joining member or rivet 150 is shown extending through respective passages or bores 152 defined in the ring gear 132 and passages or bores 154 defined in the clutch basket 140. While the mechanical connection is shown as a rivet 150, it is appreciated that the rivet 150 can alternatively be other mechanical coupling members such as, but not limited to, bolts, stakes, and pins that couple the ring gear 132 to the clutch basket 140. In the examples shown the clutch basket 140 can be formed of medium or low carbon steel. The ring gear 132 can be formed of steel such as, but not limited to 8620 alloy steel. The mechanical joining members 150 can be formed of steel such as low or medium carbon steel. In other examples, the mechanical joining members 150 can be formed of 20MnB4 carbon steel. Other high strength materials are contemplated for the mechanical joining members 150.

Figures 4, 5:
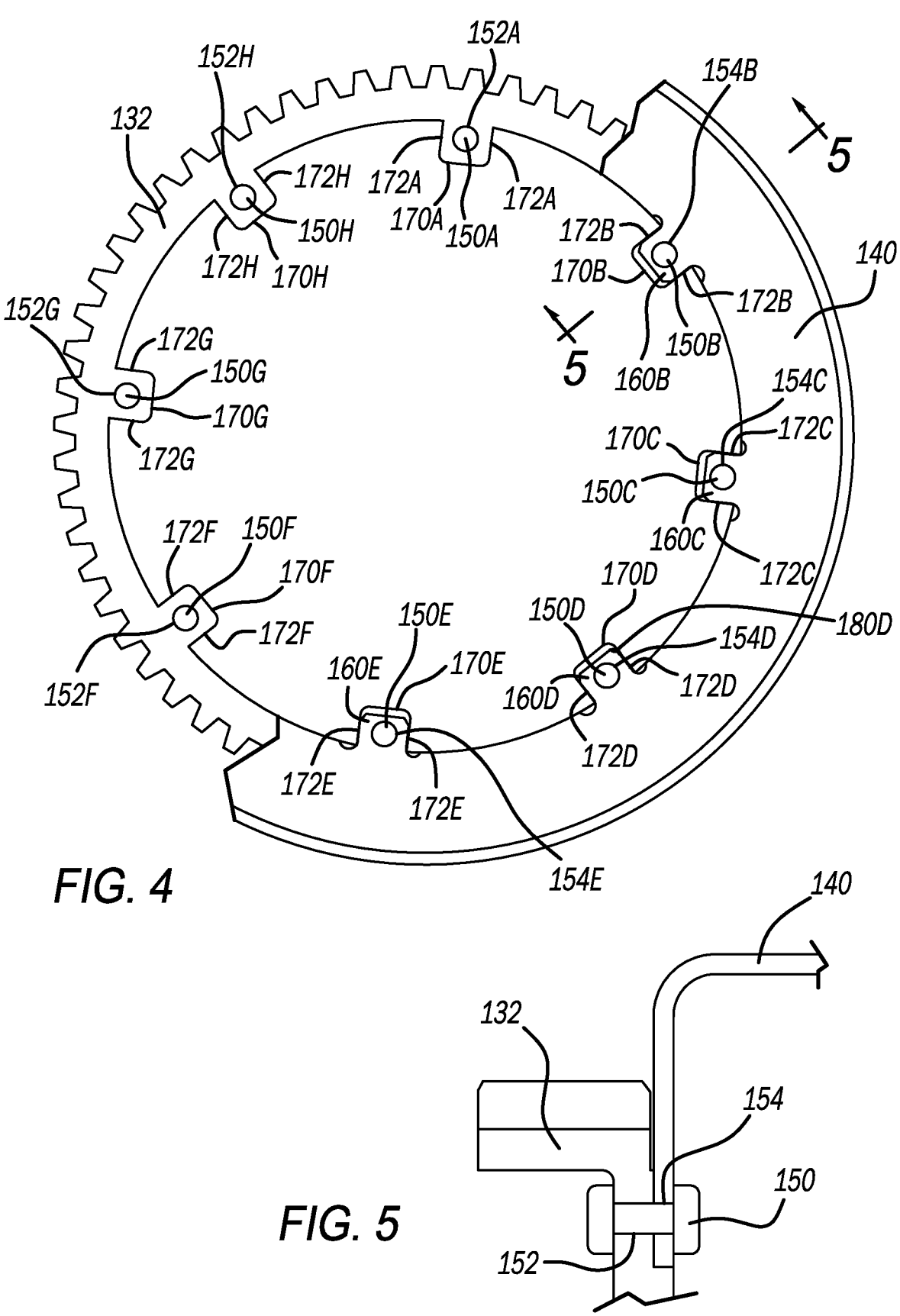
FIG. 4 is a plan view of the clutch basket and the ring gear of FIG. 3 shown with the clutch basket partially removed for illustrative purposes according to examples of the present application.
FIG. 5 is a cross-sectional view taken along lines 5-5 of FIG. 4 according to examples of the present application.

With continued reference to FIG. 3 and additional reference to FIGS. 4 and 5, the mechanical coupling between the ring gear 132 and the clutch basket 140 in the electric drive gearbox assembly 120 will be further described. The rivets are collectively identified at 150 in FIGS. 3 and 5 and individually identified at reference 150A-150H in FIG. 4. The clutch basket 140 is provided with a series of tabs individually identified at 160B-160E. While the tabs 160B-160E are specifically shown in FIG. 4, it is appreciated that tabs 160A-160H are configured to extend generally around a circumference of the clutch basket 140.

In the example shown, the tabs 160B-160E are configured to be equally spaced apart. While there are shown four tabs 160B-160E, it will be appreciated that eight tabs 160A-160H are configured around the whole clutch basket 140 with tabs 160A, and 160F-160H removed for illustrative purposes. Moreover, it is appreciated that additional or fewer tabs may be included within the scope of the present disclosure. In the example shown the tabs 160 are provided in diametrically opposing manner such that tabs 160A and 160E oppose each other, tabs 160B and 160F oppose each other, tabs 160C and 160G oppose each other and 160D and 160H oppose each other. Each tab 160A-160H includes a respective passage (see passages 154B-154E shown in FIG. 4).

The ring gear 132 defines a complementary series of insets 170A-170H defined therein. The tabs 160A-160H are configured to locate into the respective complementary insets 170A-170H defined around the ring gear 132. Each inset 170A-170H provides a pair of opposing inset sidewalls 172A-170H. The tabs 160A-160H therefore nest within the insets 170A-170H providing supplemental mechanical fixing that inhibit relative rotation of the ring gear 132 and the clutch basket 140. In this regard, the opposing inset sidewalls 172A-172H of the respective insets 170A-170H oppose and inhibit rotation of the nested tabs 160A-160H. In additional examples, a weld (such as identified at 180D) can be additionally or alternatively be provided between the tabs 160A-160H and the insets 170A-170H.

The mechanical coupling associated with the rivets 150 as well as the interface between the tabs 160 of the clutch basket 140 and insets 170 of the ring gear 132 absorbs the tangential and partially radial gear mesh loads associated with the ring gear 132 improving robustness and durability of the ring gear 132 and clutch basket 140 connection and the electric drive gearbox assembly 120 as a whole.

It will be appreciated that while the mechanical coupling between the ring gear 132 and the clutch basket 140 has been described herein in the context of an electric drive gearbox assembly 120, the same concepts may be adapted for use in other gearbox assemblies such as those associated with transmissions receiving a torque input from an internal combustion engine. Other torque transfer devices or mechanical arrangements having a gear input that is otherwise coupled to another member such as a clutch basket can be also adapted for implementing the teachings of the instant disclosure.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electric drive module that generates and transfers drive torque to a driveline of an electrified vehicle, the electric drive module comprising:
an electric drive gearbox assembly comprising:
a ring gear that receives a rotational input from an electric motor of the electric drive module, the ring gear defining a series of insets formed therearound and a first plurality of passages therein;
a clutch assembly including a clutch basket that receives a plurality of clutch plates therein, the clutch basket having a second plurality of passages therein, wherein the clutch basket defines a series of tabs extending around a circumference thereof, wherein the second plurality of passages are respectively formed in the series of tabs, the series of insets cooperating to receive the respective series of tabs of the clutch basket; and
a plurality of mechanical joining members that extend through the first plurality of passages of the ring gear and the second plurality of passages in the clutch basket, the plurality of mechanical joining members mitigating loads experienced between the ring gear and the clutch basket.

2. The electric drive module of claim 1, wherein the series of tabs are equally spaced around the circumference of the clutch basket.

3. The electric drive module of claim 1, wherein the series of insets each include opposing inset sidewalls.

4. The electric drive module of claim 3, wherein the series of tabs of the clutch basket nest within the respective series of insets of the ring gear.

5. The electric drive module of claim 4, wherein the opposing inset sidewalls oppose and inhibit rotation of the respective tabs of the clutch basket.

6. The electric drive module of claim 5, wherein the plurality of mechanical joining members comprise rivets.

7. The electric drive module of claim 5, wherein the plurality of mechanical joining members comprise bolts.

8. The electric drive module of claim 5, further comprising a weld that joins the ring gear and the clutch basket.

9. An electric drive module that generates and transfers drive torque to a driveline of an electrified vehicle, the electric drive module comprising:
an electric drive gearbox assembly comprising:
a ring gear that receives a rotational input from an electric motor of the electric drive module, the ring gear defining a series of insets thereon that define a respective first plurality of passages therein;
a clutch assembly including a clutch basket that receives a plurality of clutch plates therein, the clutch basket including a series of tabs extending around a circumference thereof, wherein a second plurality of passages are respectively formed in the series of tabs; and
a plurality of mechanical joining members that extend through the first plurality of passages of the ring gear and the second plurality of passages in the clutch basket;
wherein the series of tabs nest within the respective series of insets thereby mitigating loads experienced between the ring gear and the clutch basket.

10. The electric drive module of claim 9 wherein the series of tabs are equally spaced around the circumference of the clutch basket.

11. The electric drive module of claim 10, wherein the series of insets each include opposing inset sidewalls.

12. The electric drive module of claim 11, wherein the opposing inset sidewalls oppose and inhibit rotation of the respective tabs of the clutch basket.

13. The electric drive module of claim 12, wherein the plurality of mechanical joining members comprise rivets.

14. The electric drive module of claim 12, wherein the plurality of mechanical joining members comprise bolts.

15. The electric drive module of claim 12, further comprising a weld that joins the ring gear and the clutch basket.

* * * * *